United States Patent [19]

Kee

[11] 4,064,519
[45] Dec. 20, 1977

[54] REGULATED STROBE FOR CAMERA WITH SIXTH FLASH INHIBIT

[75] Inventor: Richard C. Kee, Chestnut Hill, Mass.

[73] Assignee: Polaroid Corporation, Cambridge, Mass.

[21] Appl. No.: 710,857

[22] Filed: Aug. 2, 1976

[51] Int. Cl.² .............................................. G03B 15/03
[52] U.S. Cl. .................................... 354/141; 354/145; 354/149
[58] Field of Search .................. 354/23 R, 32, 33, 34, 354/35, 59, 60 R, 60 F, 129, 132, 139, 141, 145, 149

[56] References Cited

U.S. PATENT DOCUMENTS

| | | | |
|---|---|---|---|
| 3,930,184 | 12/1975 | Biber et al. | 315/241 P |
| 3,964,077 | 6/1976 | Strauss | 354/141 |
| 4,005,499 | 1/1977 | Ellin | 354/128 |
| 4,016,575 | 4/1977 | Uchiyama et al. | 354/33 |

*Primary Examiner*—L. T. Hix
*Assistant Examiner*—William B. Perkey
*Attorney, Agent, or Firm*—Edward S. Roman

[57] ABSTRACT

An electronic flash accessory is provided for a camera of the type having a flash socket assembly adapted for receipt of a conventional multiple flash bulb array together with circuitry for sampling the terminals of the flash socket which are adapted to connect to the last flash bulb scheduled to be fired in the array and for providing a signal which operates to inhibit camera operation when the sampled impedance of the last flash bulb scheduled to be fired is substantially different from the impedance of an unfired non-defunct flash bulb. The electronic flash accessory includes circuitry responsive to a predetermined event relative to the readying of the flash accessory in expectation of the commencement of a photographic exposure cycle involving an artificially illuminated subject for simulating the impedance of an unfired non-defunct flash bulb in order to enable the camera to automatically perform a photographic exposure cycle upon actuation by the camera operator.

5 Claims, 5 Drawing Figures

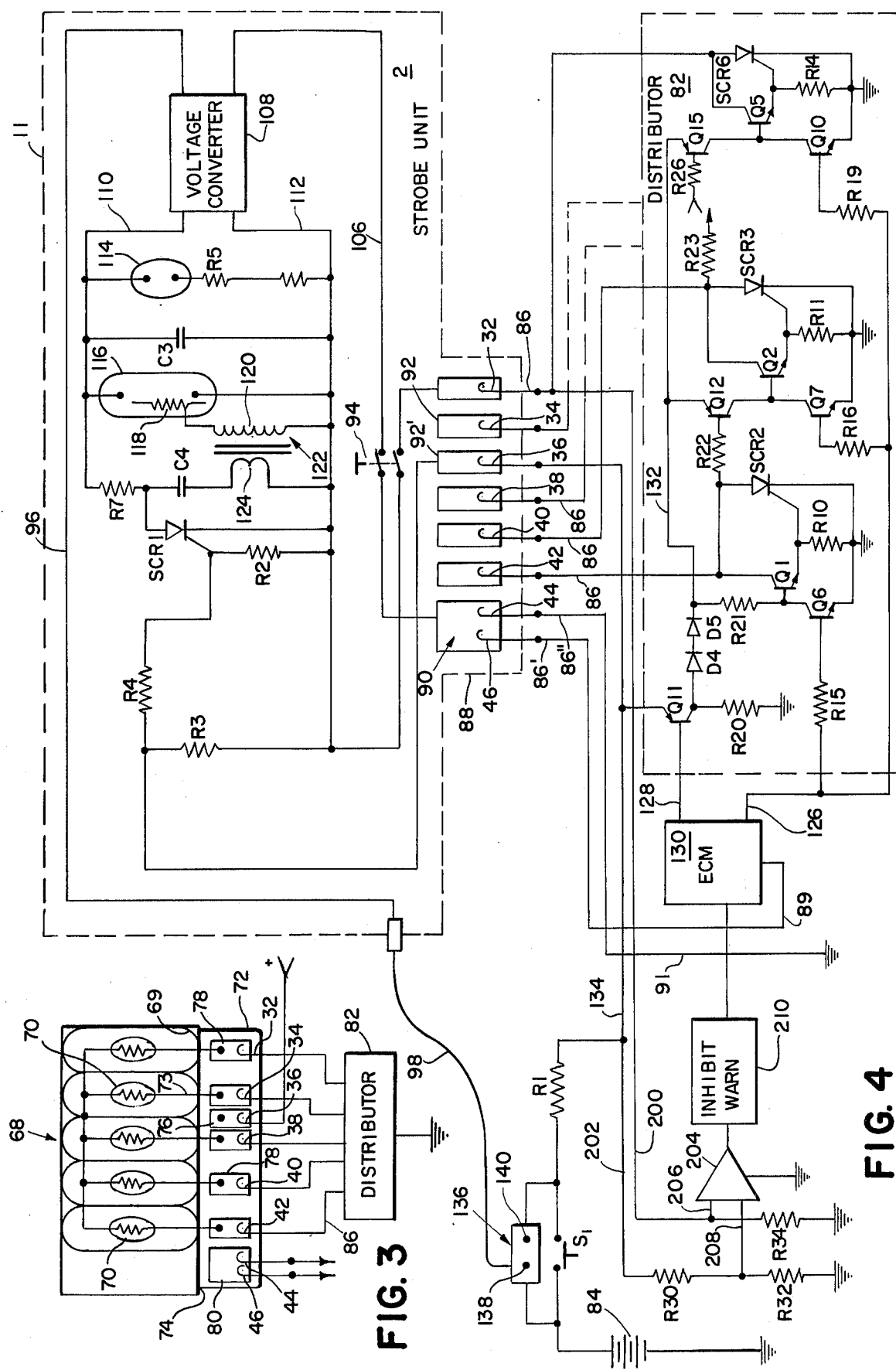

REGULATED STROBE FOR CAMERA WITH SIXTH FLASH INHIBIT

BACKGROUND OF THE INVENTION

1. Field of the Invention

The present invention relates to a particular electronic flash arrangement adapted for use with cameras of the type having a last flash inhibit feature and more particularly to an electronic flash accessory which is adapted to enable a camera of the type having a last flash inhibit feature in response to a predetermined event relative to the readying of the flash accessory in expectation of the commencement of a photographic exposure cycle involving an artificially illuminated subject.

2. Description of the Prior Art

Both the Polaroid SX-70 Land Camera and the newly introduced pronto! Camera, made and sold by the Polaroid Corporation of Cambridge, Massachusetts, U.S.A., are adapted to make photographs automatically either by ambient light or with the aid of a flash lamp array. For this purpose, the camera is provided with an accessory socket in the shutter and lens board housing which will accept a part from a flash lamp array. The flash lamp array includes five flash lamps in one array and five in another so that five sequential exposures can be made, each with a different bulb, when the array is inserted in the socket in either position. The remaining five lamps can be sequentially used by removing the flash array, and putting it back in facing the opposite direction.

The camera is provided with a sequencing circuit to select the next unfired bulb for energization, and to sequence the camera circuits which operate the shutter, control the mirror and operate the processing rolls.

The camera may also include a so-called "last flash inhibit feature" whereby the exposure system detects the expenditure of the last flash lamp scheduled to be fired within the flash lamp array and automatically inhibits the performance of an automatic photographic exposure cycle. Such an inhibiting feature is fully described in a copending Application for U.S. patent Ser. No. 482,379 now U.S. Pat. No. 4,005,449 issued on Jan. 25, 1977, entitled "Flash Photographic System With Camera Inhibit Feature" by Seymour Ellin filed June 24, 1974.

It is highly desirable to extend the capabilities of the Polaroid SX-70 Land Camera as well as the new Polaroid Pronto! Camera for use with an electronic flash. One type of strobe suitable for use with Polaroid's SX-70 Land Camera is disclosed in an Application for U.S. patent Ser. No. 679,698 entitled "Compact Accessory Strobe For Camera With Battery Enclosed Film Pack," filed Apr. 23, 1976 in common assignment herewith. Connection of the aforementioned strobe to the Polaroid SX-70 Land Camera of the type having the last flash inhibit feature exerts no operative influence on the automatic electronic exposure control system of the camera. In other words, connection of the aforementioned strobe to the SX-70 Land Camera will enable the camera upon actuation by the user to perform its automatic exposure cycle regardless of whether the strobe is in a state of readiness to provide adequate artificial illumination.

A camera which is adapted solely for use with a detachable electronic flash accessory additionally includes a feature for inhibiting the camera exposure control system until the charging of the flash unit is initiated by pressing a button and the flash unit is fully charged at which time the camera is automatically enabled to make a flash exposure. Such a camera and detachable electronic flash unit are fully described in a copending Application for U.S. patent Ser. No. 698,715 entitled "Camera With Detachable Electronic Flash Unit And Exposure Control System Therefore", by Edwin H. Land and Richard C. Kee, filed June 22, 1976 in common assignment herewith. The camera and strobe arrangement of this invention, however, do not provide for ready interchangeability with the aforementioned flash lamp array.

Therefore, it is a primary object of this invention to provide an electronic flash accessory for use with cameras of the type having a flash lamp receiving socket as well as a last flash inhibit feature whereby the strobe unit exerts an operative influence on the automatic control system of the camera.

It is another object of this invention to provide an electronic flash accessory for use with Polaroid's SX-70 Land Cameras and New Pronto! Cameras of the type having a last flash inhibit feature whereby operation of the automatic exposure control systems of these cameras is inhibited until the occurrence of some predetermined event relative to the readying of the flash accessory in expectation of the commencement of a photographic exposure cycle involving an artificially illuminated subject.

Other objects of the invention will in part be obvious and will in part appear hereinafter. The invention accordingly comprises the mechanism and system possessing the construction, the combination of elements and the arrangement of parts which are exemplified in the following and detailed disclosure.

SUMMARY OF THE INVENTION

The invention relates to an electronic flash accessory for use with a camera of the type having a flash socket assembly adapted for receipt of a conventional multiple flash bulb array together with means for sensing the terminals of a flash socket which are adapted to connect to the last flash bulb scheduled to be fired in the array and for providing a signal which operates to inhibit camera operation when the independence of the last flash bulb scheduled to be fired is substantially different from the impedance of an unfired non-defunct flash bulb. The flash unit comprises: a housing, a storage capacitor, a discharge tube, and means responsive to an applied voltage for charging the capacitor. The flash accessory further includes means responsive to an applied trigger signal for discharging the capacitor through the discharge tube to produce an illuminating flash of light. In addition, connector means are provided for electrically connecting the discharge means to the camera flash socket whereby the connector means terminates in at least two terminal elements configured to connect respectively to those terminals of the flash socket which are adapted to connect to the last flash bulb in the array scheduled to be fired. The terminal elements thereby receive the applied trigger signal from the camera. There are further included means normally operative for providing an impedance characteristic across the connector means terminal elements, which impedance is substantially different from the impedance of an unfired non-defunct flash bulb in order to inhibit camera operation upon connection of the discharging means to the camera socket. The impedance providing means is responsive to a predetermined event relative to the readying of the flash accessory in expectation of the commencement of a photographic exposure cycle involving an artifically illuminated subject for simulating the impedance of an unfired non-defunct flash bulb across the connector means terminal elements in order to enable the camera to perform a photographic exposure cycle involving an artifically illuminated subject upon actuation of the camera by the operator.

DESCRIPTION OF THE DRAWINGS

The novel features that are considered characteristic of the invention are set forth with particularity in the appended claims. The invention itself, however, both as to its organization and its method of operation, together with other objects and advantages, thereof, will be best understood from the following description of the illustrated embodiment or when read in connection with the accompanying drawings or when like members have been employed in the different figures to note the same parts and wherein:

FIG. 3 is a schematic diagram of a portion of the camera of FIG. 1 in combination with a multilamp flash assembly;

FIG. 4 is a schematic diagram of the control circuitry for the camera of FIG. 1 in combination with the electronic flash circuitry for the flash accessory in FIG. 1.

DESCRIPTION OF THE PREFERRED EMBODIMENT

Figure 1:
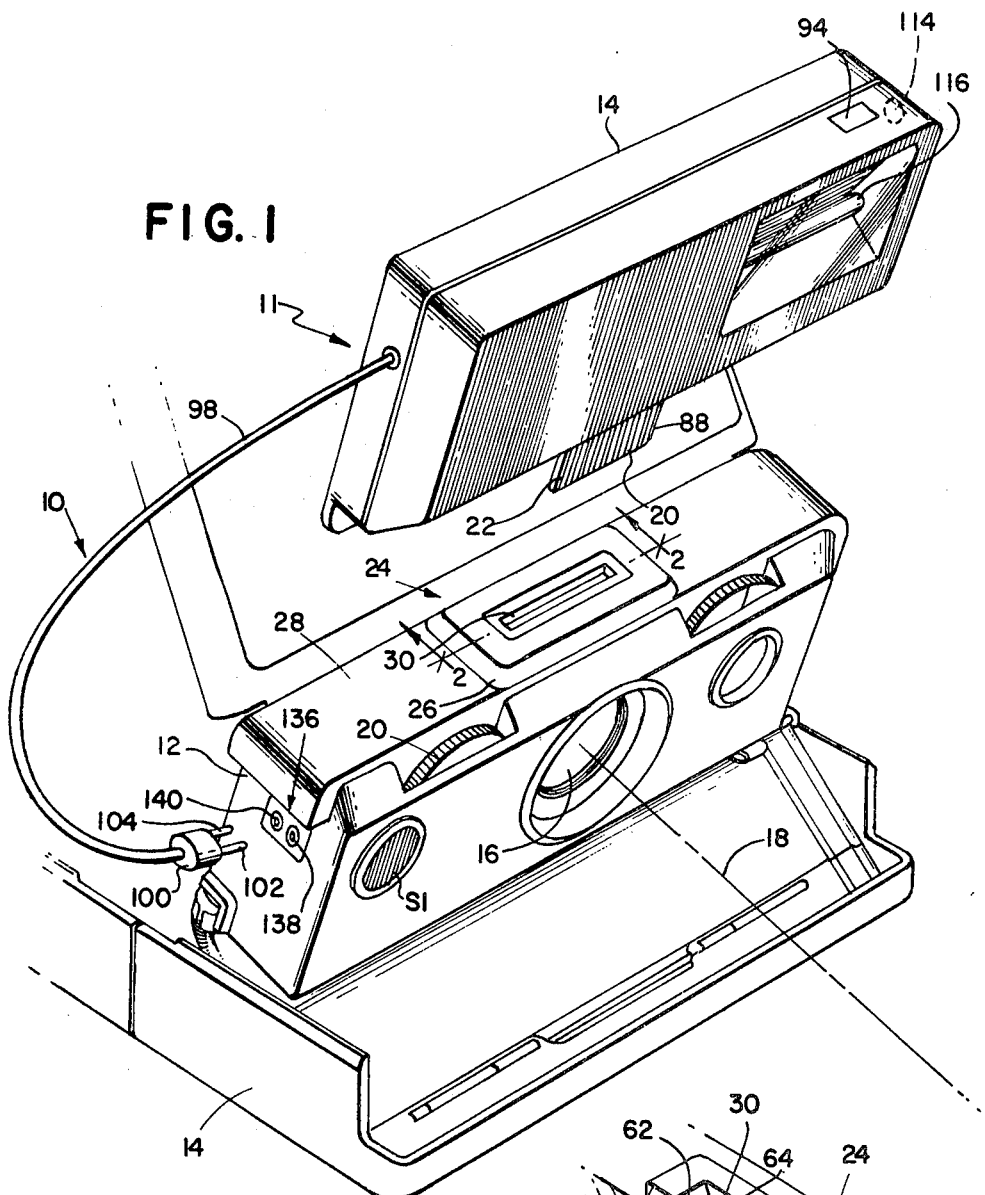
FIG. 1 is an exploded partial perspective view of the electronic flash accessory of this invention in combination with a camera apparatus.

Referring now to FIG. 1 there is shown a front portion of a folding Polaroid SX-70 Land camera 10 of the type more fully shown and described in U.S. Pat. No. 3,820,128 by J. Burgarella et al. entitled "Flat Photographic Control System" issued June 25, 1974 and assigned in common herewith. Camera 10 is illustrated as including a shutter housing section 12 mounted to pivot into a face down position on a housing section 14 when the camera is folded for storage. Housing section 12 includes a lens and shutter assembly 16 which may be of the type shown in U.S. Pat. No. 3,200,723 having a picture taking axis 18, a focus wheel 20 for focusing the lens and an actuator button S1 for initiating the exposure cycle of the camera. Housing section 12 further includes a flash socket assembly 24 having a boss 26 which extends through a wall 28 of shutter housing section 12 and defines an entrance slot 30 which is orthogonal to picture taking axis 18 for receiving the connector blade 72 of either a disposable multilamp flash assembly as shown generally at 68 in FIG. 3, or alternatively the connector blade 88 of the strobe unit 11 of this invention shown in FIG. 1.

Figure 2:
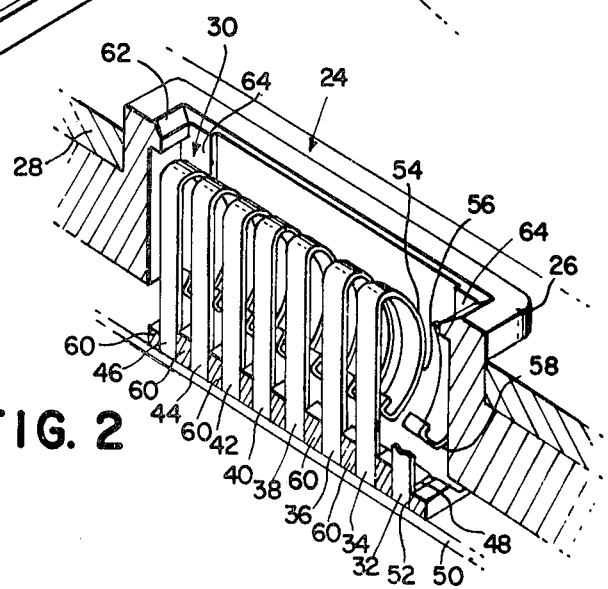
FIG. 2 is a cut-away perspective view of a portion of the camera of FIG. 1.

Referring now to FIG. 2, the flash socket assembly 24 is shown to include a first set of contacts or terminal strips 32, 34, 36, 38, 40 and 42 and a second set of contacts or terminal strips 44 and 46. Each of the contacts is preferably composed of a spring material having high electrical conductivity and high tensile strength such as certain berryllium copper alloys. A nickel silver coating is preferably applied to the contact to minimize contact resistance. Each of the contacts includes a base section 48 for connection to leads on a printed circuit substrate 50, a spine 52, and a reverse bent section including an entrance ramp portion 54, a contact portion 56, and an exit ramp portion 58. The entrance and exit ramp portions 54 and 58 assure a smooth insertion and withdrawal of the connector blade. The contact portions 56 apply a loading force on the contiguous surface of the connector blade in a direction normal to the plane of the connector blade from either a multilamp flash assembly or strobe unit so as to retain the blade in the socket assembly, and so as not to introduce any lifting force component which might tend to raise the connector blade from the socket assembly. Spacing means 60 are interdigitated with the contacts to maintain the parallel relationship between the contacts and to prevent a contact from moving into electrical engagement with an adjacent contact. Socket assembly 24 also includes an outwardly beveled mouth 62 surrounding slot 30 and walls 64 which guide the connector blade into its operative position within the socket assembly.

As schematically indicated in FIG. 3, the conventional multilamp flash assembly or array 68 may comprise an insulating block or support section 74 supporting 5 reflectors 69 comprising reflective recesses in which each of a series of 5 flashlamps 70 is mounted. Five additional flashlamps are similarly disposed on the opposite side of the flash assembly 68. Each of the flashlamps 70 has one terminal connected to a common terminal 76 formed as a conductive strip on connector blade 72 of insulated material that is adapted to fit into the socket of assembly 24. Each of the flashlamps 70 has a second terminal connected to a different one of a set of 5 output terminals 78, also formed as conductive strips on the connector blade 72.

Upon insertion of the connector blade 72 of the flash array 68 within the flash socket assembly 24 of FIG. 1, the second terminals 78 make respective electrical contact with the socket terminal strips 32 through 42. The terminal strips 32 through 42, in turn, are connected to a distributor of flash sequencing circuit schematically indicated at 82. Generally, in response to an input trigger signal supplied to the distributor circuit 82 in a manner to be subsequently described in greater detail, the distributor circuit operates to effectively connect one of the terminals 78 selected in a predetermined sequence to a ground terminal. The common terminal 76 is also connected to the positive supply terminal of a battery shown schematically at 84 in a manner to be subsequently described. The battery 84 is preferably insertable within the folding camera 10 in correspondence with the film pack or cassette in a manner as is well known in the art for Polaroid SX-70 type film cassettes and cameras. The distributor circuit 82 operates in a manner to be subsequently described to selectively ground the terminal 78 connected to the first unfired flashbulb 70 in an ordered sequence in the array so that when one of the terminals 78 is grounded current flows through the associated flashlamp 70.

The connector blade 72 is provided with a relatively wide terminal 80 that bridges the pair of terminal strips 44 and 46 upon insertion of the connector blade 72 within the socket assembly 24. Electrically shorting terminal strips 44 and 46 operate to signal the camera circuit that the flash array is in position in the camera and ready to be used.

Referring now to FIG. 4 there are shown the details of the electronic flash accessory or strobe unit 11 of this invention adapted to cooperate with the camera of FIG. 1, together with a particular form of distributor network 82 adapted to cooperate with an electronic control module (ECM) 130, the details of which may be more readily understood from U.S. Pat. No. 3,820,128, supra, together with U.S. Pat. No. 3,930,184 entitled "Electronic Flash Coupling System For Sequential Flashbulb Firing Circuit" by C. Biber issued December 30, 1975 and assigned in common herewith. More specifically, strobe unit 11 includes connector blade 88 on which there is provided a wide terminal 90, corresponding to the terminal 80 in FIG. 3. Five terminals 92 are also provided corresponding to the terminals 78 in FIG. 3 and one terminal 92' is provided corresponding to the common terminal 76 in FIG. 3. As will be readily apparent, only one of the five terminals 92 is electrically necessary and the other terminals may be omitted if desired. The wide terminal 90 of the strobe connector blade 88 is adapted to electrically connect the terminal strips 44 and 46 thereby enabling the electronic control module 130 by providing its sole connection to the ground terminals of battery 84 through lines 89 and 91 which are electrically connected in serial relation through terminal strips 44 and 46 and wide terminal 90.

One of the terminals 92, here shown as the one adjacent the right end of the connector blade 88, is connected to the common terminal 92' by way of a resistor $R_3$, which corresponds to the impedance of an unfired and non-defunct flashlamp and one set of terminal elements of a double pole, single throw — off switch 94. R3 simulates the impedance of an unfired flashlamp for reasons which are more fully apparent in U.S. Pat. No. 2,858,227 entitled "Adaptor Apparatus for Flash Firing System" by S. Ellin et al, issued Dec. 31, 1974 and assigned in common herewith. Thus, the resistor R3 preferably has a value in the order of 4 ohms, approximately the resistance of a non-defunct flashlamp before it is fired. Connected in parallel with the resistor R3 is a current limiting resistor R4 in serial connection to a gate resistor R2.

The strobe unit 11 is also adapted to receive an external substantially steady state DC battery voltage from the lines 96 and 106 for powering a conventional voltage converter 108. As is now readily apparent, the second set of terminal elements from the switch 94 are provided in serial connection with respect to the line 106. Thus, the user may control the power connection to the voltage converter 108 by way of the on-off switch 94. The voltage converter 108 operates in a conventional manner to convert the DC voltage, as may be derived from battery 84 which is preferably 6 volts, to a suitable strobe operating voltage such as 350 volts. This voltage appears on a pair of output terminals or lines 110 and 112 from the voltage converter 108.

The first circuit path across the output terminals 110 and 112 includes a series ready-light 114, and a resistor R5 in series therewith. The ready-lamp 114 may be a conventional gas discharge lamp of any suitable design. The resistor R5 is selected to limit the current flowing through the lamp 114 to a suitable value. A second path across the leads 110 and 112 and comprises a storage capacitor C3 in a suitable size for storage of the energy necessary to fire a gas tube 116. The gas tube 116 has electrodes connected across the leads 110 and 112 in the third path. The tube 116 is triggered to produce a flash of light when the capacitor C3 is sufficiently charged to allow the lamp 114 to glow and a relative high voltage spike, such as 5,000 volts is applied to the grid terminal 118 of the tube 116.

The grid 118 is connected to the lead 112 through the high voltage secondary winding 120 of a pulse transformer generally designated at 122. The low voltage primary winding 124 of the transformer 122 has one terminal connected to the lead 112 and a second terminal connected through a capacitor C4, in series with a resistor R7, to the lead 110. A silicon controlled rectifier SCR1 has its anode terminal connected to the junction of the resistor R7 and the capacitor C4 and its cathode connected to the lead 112. Resistor R2 is connected between the gate and the cathode of the silicon controlled rectified SCR1 to prevent false triggering of the controlled rectifier.

In order that the strobe unit 11 be made as compact as possible, it is desired that the voltage converter 108 be powered directly from the camera battery 84. During operation of the strobe unit 11 when the switch 94 is closed, the capacitors C3 and C4 will be charged. When the charge is adequate to develop a suitable flash of light for exposure, the ready lamp 114 will discharge and glow, indicating that the strobe unit is ready for use. Thereafter an appropriate input signal applied to the terminals 92 and 92' by the distributor circuit 82 will operate to gate the silicon controlled rectifier SCR6 into conduction in a manner to be subsequently described, causing discharge of the capacitor C4 through the primary winding 124 of the transformer 122, resulting in a triggering spike being applied to the grid 118 of the flashtube 116 to cause it to discharge and produce a flash. Discharge of the capacitor C3 through the tube 116 will cause the ready light 114 to be extinguished. With the discharge of the capacitor C4, ringing in the discharge circuit will cause a momentary reversal of voltage sufficient to cutoff the silicon controlled rectifier SCR6.

The distributor circuit 82 comprises 5 electronic switches, hereshown as an ordered array of silicon controlled rectifiers SCR2 through SCR6. Of these, only the first silicon controlled rectifier SCR2 in the sequence, the second SCR3, and the last SCR6, are shown. The stage comprising the switch SCR3 is typical of the storage stages comprising the rectifiers SCR4 and SCR5, not shown.

The anode terminals of the silicon controlled rectifiers SCR2 through SCR6 connect respectfully to the terminal strips 32 through 42 with all the cathode terminals connecting to ground. Each of the gates of the controlled rectifiers SCR2 through SCR6 is connected to ground through a different one of a set of resistors R10 through R14 of which only the resistors R10, R11 and R14 are shown. Each of the controlled rectifiers SCR2 through SCR6 has its anode connected to the collector of a different one of a set of 5 gate control NPN transistors Q1 through Q5. The emitter of each of the transistors Q1 through Q5 is connected to the gate of a different one of the controlled rectifiers SCR2 through SCR6. The base of each of the transistors Q1 through Q5 is connected to the collector of a different one of a set of 5 inhibit NPN transistors Q6 through Q10. The emitter of each of the transistors Q6 through Q10 is grounded with respect to the battery 84. The base terminals of transistors Q6 through Q10 are each connected through a different one of a series of current distributing resistors R15 through R19 to an output terminal 126 from the electronic control module 130.

When the electronic control module 130 provides a positive voltage signal corresponding to a logic 1 at output terminal line 126, each of the transistors Q6 through Q10 is gated into conduction thereby preventing any of the transistors Q1 through Q5 from being biased into conduction. The electronic control module 130 also provides a trigger signal at output terminal line 128 to the base of a PNP transistor Q11. The emitter terminal of transistor Q11 is connected to the positive voltage side of the battery 84 by way of a resistor R1 and the actuator button S1. Thus, the emitter terminal of transistor Q11 receives a positive potential from the battery 84 when the button S1 is depressed. The collector of transistor Q11 is returned to ground through a resistor R20. The collector of transistor Q11 also connects to a lead 132 through a pair of diodes D4 and D5 in series.

The lead 132 is connected to the base terminal of the transistor Q1 through a resistor R21. The lead 132 is also connected to the emitters of a group of 4 logic PNP transistors Q12 through Q15, of which only the transistors Q12 and Q15 are shown. The collectors of the transistors Q12 through Q15 are connected to the bases of the transistors Q2 through Q5, respectively.

The base of the transistor Q12 is connected to the anode of the controlled rectifier SCR2 through a resistor R22. A similar resistor R23 connects the anode of the controlled rectifier SCR3 to the next stage transistor Q13, not shown. Other stages are similarly connected, e.g., the base of the transistor Q15 is connected to one terminal of a resistor R26, and the other terminal of the resistor R26 is connected to the anode of the controlled rectifier SCR5, not shown.

Referring now to FIG. 3 in conjunction with FIG. 4 it can be seen that the distributor circuit 82 is designed to fire each lamp in order from first to last. This is accomplished by having each switching circuit receive a trigger signal only when the preceding flashlamp is open circuited. Assuming that none of the flashlamps have been fired and that the distributor circuit 82 is triggered at the appropriate time by the electronic control module 130, which appropriate time is generally programmed to occur when the shutter is fully open in response to depression of actuator button S1 as fully disclosed in U.S. Pat. Nos. 3,930,184 and 3,820,128, supra. The appropriate trigger signal from the electronic control module 130 provides a zero or negative potential signal at output terminal line 126 so as to maintain the inhibit transistors Q6 through Q10 in a nonconducting state while a negative going pulse is provided at the output terminal line 128 to gate transistor Q11 into conduction. Turning on transistor Q11 operates to render gate control transistor Q1 conductive so as to switch on SCR2 thereby effectively coupling the first lamp 70 across the battery 84 supplied voltage so as to fire the lamp. As the lamp 70 is initially supplied with current and begins to flash, SCR3 will not turn on because its gate control transistor Q2 remains in a nonconductive state. The latter falls from the fact that its associated logic transistor Q12 is not rendered conductive. That is, the voltage across the emitter-base junction of the transistor Q12 is substantially identical to the voltage across the flashing lamp and the latter voltage is low in as much as the initial filament resistance is also very low. It should be readily appreciated, however, that if the lamp filament heats up, its resistance increases (just prior to opening of the filament) and the voltage across the lamp will accordingly increase. However, the electronic control module 130 operates to turn on inhibit transistors Q6 through Q10 so that subsequent circuits cannot turn on at this latter time during flashing of a preceding lamp. Thus, once the firing of a particular bulb is initiated, a high level in each signal is provided from the distributor circuit 82 for feedback through the electronic control module 130 so that the distributor circuit 82 is clamped off so as to prevent additional lamp firing at that time as is more fully described in U.S. Pat. No. 3,930,184, supra.

Following the firing of the first lamp, when a subsequent trigger signal is received from the electronic control module 130 the first SCR2 will be in a conductive state and the voltage across the first open lamp is high so that the voltage across the transistor Q12 will exceed the threshold voltage necessary to turn on this transistor. The latter, in turn, provides a suitable gating signal to the second SCR3 through gate transistor Q12 so as to draw ignition current through the second lamp. However, during initiation of current through the second lamp, the following SCRs will not be turned on in as much as transistor Q13 (not shown) is in parallel with the conducting line, and hence, is not biased for conduction. In this manner, the distributor circuit 82 will operate to fire each lamp in order from first to last with SCR6 being the last to turn on.

There is also shown a detector arrangement for examining the impedance of the last flashlamp 70 which is scheduled to be fired in the flash assembly 68 as is more fully described in a copending application for U.S. patent Ser. No. 482,379 now U.S. Pat. No. 4,005,449, entitled "Flash Photographic System with Camera Inhibit Feature" filed June 24, 1974. The detector arrangement embodies a differential type operational amplifier 204 having a pair of input terminals 206 and 208 Input terminal 206 connects directly to the terminals strip 32 by way of an interconnecting line 200 and is also grounded by way of a resistor R34. Input terminal 208 connects to the junction between a pair of resistors R30 and R32. The other side of resistor R32 is grounded while the other side of resistor R30 connects to the terminal strips 36 by way of interconnecting lines 202 and 134. Since terminal strips 32 and 36 connect to the last flashlamp scheduled to be fired, the resistance value of resistor R30 is selected to correspond with the predetermined impedance evidenced by a fully expended flash array (at least 75 ohms). Resistors R32 and R32 are configured to have substantially the same resistive values so as to define a voltage dividing comparison network, the output of which at terminals 206 and 208 is amplified by the amplifier 204. It will be readily understood that the amplifier 204 is also coupled to the positive and negative terminals of battery 84 by means not shown. The output of amplifier 204 in turn is connected to an inhibit and warn network 210 which may operate to provide both a warning signal to the user as well as an inhibit signal to the ECM 130 when the last flashlamp is expended. Thus, when a flash assembly with an operative last flashlamp is inserted within the socket 24, the output from the amplifier 204 may be considered "low" and the inbihit and warn network 210 allows normal operation of the ECM 130. When the resistance across the terminal strip 32 and 36 is high as happens when the last flashlamp is expended, then the output of amplifier 204 reverts to an opposite level, for instnce "hight" so as to inhibit further camera operations.

Assume now that the strobe unit 11 of FIG. 4 is inserted into the flash socket assembly 24, with the on-off switch 94 being in the normal off position. As is readily apparent, with connecting line 106 so opened, charging current from the folding camera 10 as shown in FIG. 1 cannot be directed to the voltage converter 108 and hence the capacitor C3 cannot be charged. Although such charging current is described herein as being derived from the folding camera 10, it will be readily understood that a separate source of electrical energy, i.e. an electrical storage battery, may be directly associated with the strobe unit 11 entirely apart from the camera 10. Thus, for convenience the strobe charging current will be herein described as being derived from the battery 84 situated within the folding camera 10 as follows:

The battery 84 is preferably of a type, which is carried in a Polaroid SX-70 Land Film Pack as manufactured and sold for use in the Polaroid SX-70 Land Camera. Once the battery 84 is inserted within the SX-70 camera, the positive and negative terminals are automatically contacted to power circuitry and equipment within the camera 10. Although this arrangement was not initially designed or intended for use with the type of compact strobe unit 11 herein described, it has since been found that such a strobe unit may be advantageously connected to the camera 10 in a manner as is fully described in an application for U.S. patent Ser. No. 679,698, supra.

The ground terminal from the battery is in direct electrical connection with the line 91 so as to provide a direct ground connection to terminal element 44. Thus, line 106 from voltage converter 108 in strobe 11 can be directly connected to the wide terminal 90 thereby accommodating a direct electrical connection from the strobe unit 11 to the battery ground terminal when the connector blade 88 is inserted within the flash socket assembly 24. Connection from the voltage converter 108 to the positive terminal of the battery 84, however, is more difficult because as is readily apparent none of the terminal strips 32 through 46 connect directly to the positive voltage side of the battery 84. Terminal strip 36 may be indirectly connected to the positive side of the battery 84 by way of the resistor R1 and button S1, however, this arrangement is unsatisfactory due to the high current drawn by the voltage converter 108 which may damage resistor R1.

Referring now to FIGS. 4 and 1 there is shown an electrical receiving socket 136 having two spaced apart female type receiving chambers 138 and 140 in the side of shutter housing section 12. The electrical receiving socket 136 is in parallel electrical connection with respect to the actuator button S1 and accommodates the insertion of a complementary jack connecting to a remote actuator button S1 so that the camera may be remotely operated in a known manner.

The voltage converter 108 of the strobe unit 11 may thus be connected to the positive terminal of the battery 84 by way of the line 96 which serially connects to a flexible electrical connecting member 98. The outside end of the flexible member 98 terminating in an electrical insertion jack 100 having two spaced apart male prong members 102 and 104 which are adapted for insertion within the electrical receiving socket 136 in the side of the shutter housing section 12. As is readily apparent, the electrical connecting member 98 connects to only one of the prong members 102 or 104 of the jack 100 so as not to short out the button S1 and thereby actuate the camera. Thus, in this manner is the strobe unit 11 arranged to provide a direct connection to the positive and negative terminals of the battery 84 within the folding camera 10. The strobe unit 11 also receives a synchronizing signal generated within the camera 10 to fire the flash tube 16 as will be subsequently described.

As previously discussed, with the on-off switch 94 being in the off position, connecting line 106 is opened so charging current will not reach the voltage converter 108. In addition the lines connecting resistor R3 across the terminal strips 32 and 36 are also open circuited by the second set of terminal elements of the on-off switch 94. Thus, if the camera user should depress the actuator button S1 while the strobe on-off switch 94 is still in the off state, the camera circuitry will operate to first examine the impedance across the terminal strips 32 and 36 to determine if the impedance corresponds to an unfired flashlamp. Thus, as is now readily apparent, with the on-off switch 94 being in the off condition, the impedance across the terminal strips 32 and 36 is high thereby causing the output of the amplifier 204 to revert to its "high" level so as to inhibit further camera operations as previously discussed. In this manner, the strobe unit 11 may be arranged to directly control the operation of a camera of the above described type which includes a last flashlamp inhibit feature.

Once the user changes the state of the on-off switch 94 to the on condition, line 106 is connected directly to the ground terminal of battery 84 by way of the terminal element 90 and line 86" thereby energizing the voltage converter 108 so as to charge the capacitor C3 and enable the strobe unit 11. In addition, as is readily apparent, turning the on-off switch 94 on operates to connect the resistor R3 directly across the terminal strips 32 and 36. Since the impedance of R3 corresponds to the impedance of an unfired flashlamp, subsequent actuation of the button S1 by the user will again result in the aforementiond examination of the impedance across the terminal strips 32 and 36. However, with the impedance now corresponding to that of an unfired flashlamp, the amplifier 204 will now revert to its "low" level to allow normal operation of the ECM 130.

Camera operation will now procede in a normal manner with the electronic control module 130 providing a negative trigger signal at terminal line 128 thereby forward biasing the emitter-base junction of transistor Q11. At the same time a zero potential or negative potential signal is provided at output terminal line 126 to simultaneously turn off transistors Q6 through Q10. The diodes D4 and D5 operate to drop the voltage to the emitters of transistors Q12 through Q15 so that they are below the potential at their associated base terminals when the controlled rectifier SCR2 is nonconducting. The pulse of increased potential across the lead 132 will operate to bias the transistor Q1 into conduction causing the potential across the resistor R10 to rise, and supply gate current to the controlled rectifier SCR2.

However, the voltage across the open terminal strips 36 and 42 is high so that the voltage across the transistor Q12 will exceed the threshold voltage necessary to turn on the transistor. The latter, in turn, provides a suitable gating signal to the second SCR3 through gate transistor Q12. Since the voltage across the open terminal strips 36 and 48 is high, the next succeeding SCR4 will be gated to turn on. In this manner each succeeding SCR is gated to turn on with the last SCR6 being gated into avalanche conduction so as to effect a current flow through the resistors R3 in parallel with R2 and R4.

Assuming that the capacitors C3 and C4 are charged, with the SCR6 conducting, the capacitor C4 will discharge, causing the pulse transformer 122 to gate the gas tube 116 into conduction to produce a light flash during the photographic exposure interval.

Figure 5:
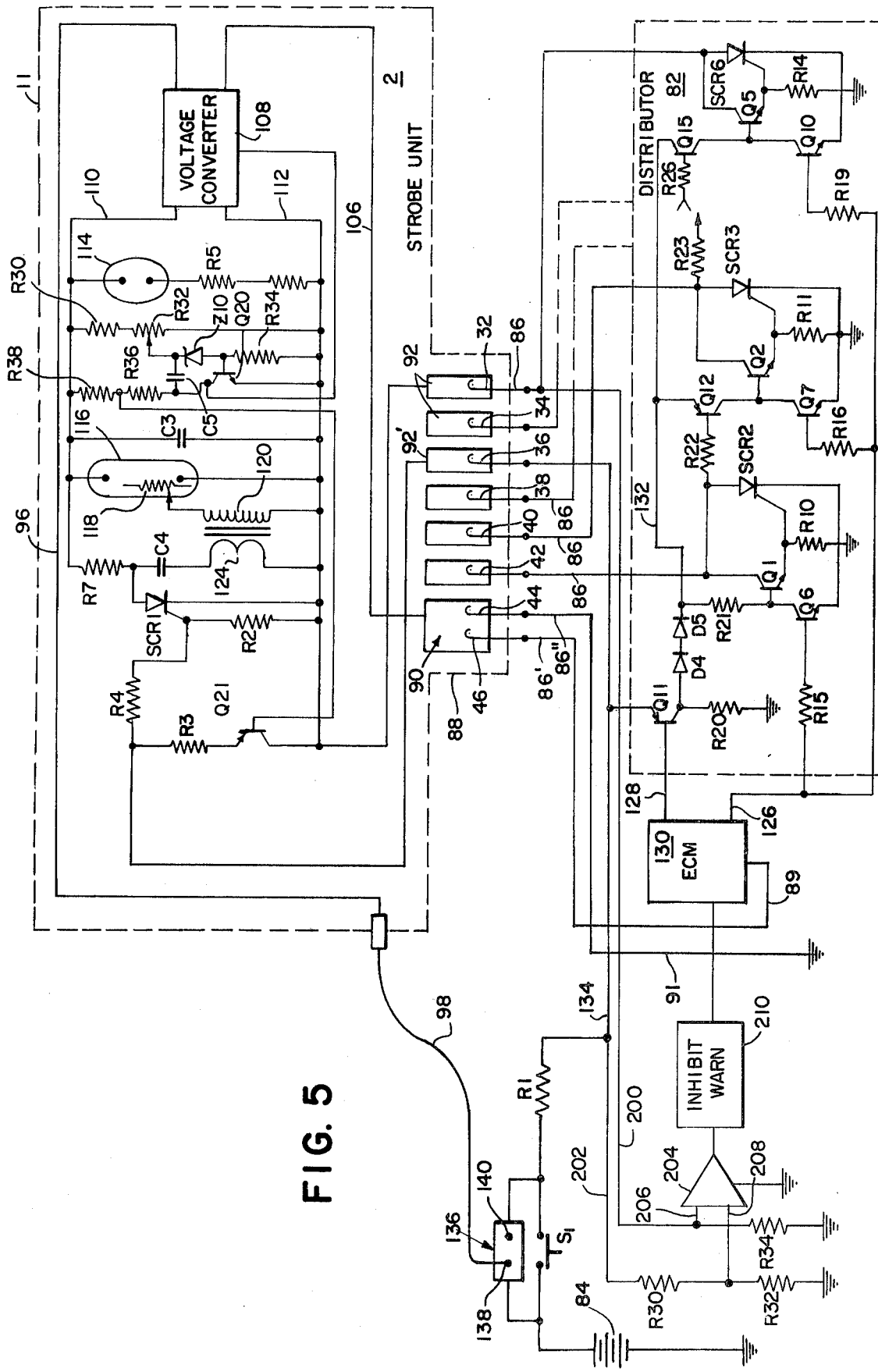
FIG. 5 is a schematic diagram for an alternate embodiment to the electronic flash circuitry for the flash accessory of FIG. 1.

Referring now to FIG. 5, where like numerals designate previously described elements, there is shown an alternate arrangement for the strobe unit 11 of FIG. 4 whereby operation of the camera may be inhibited as a function of whether the capacitor C3 is sufficiently charged so that its discharge through the gas tube 116 will produce a flashlight of adequate intensity. Toward this end the strobe circuit of FIG. 4 is modified to include a resistor divider network comprising a resistor R30 in serial connection with a variable resistor potentiometer R32. The slide of potentiometer R32 is in common connection with the cathode terminal of a conventional zener diode Z10. The anode terminal of zener diode Z10 connects to the base terminal of an NPN transistor Q20 as well as the line 112 by way of an interconnecting resistor R34. The collector terminal of transistor Q20 in turn is in common connection with respect to the other side of capacitor C5 and a resistor R36. The other side of R36 in turn is connected to the line 110 by way of another resistor R38 with the junction between resistors R36 and R38 connecting directly to the base terminal of a PNP transistor Q21. The emitter terminal of transistor Q21 connects directly to the resistor R3 with the collector terminal of transistor Q21 connecting directly to the last terminal 92 of the connector blade 88.

Assuming now that the strobe unit 11 is again inserted within the flash socket assembly 24 and that the strobe unit 11 is not provided with the on-off switch 94 so that the voltage converter starts to charge the capacitor C3 immediately upon connection to the camera. During the time when the capacitor C3 initially charges the voltage at the cathode of the zener diode Z10 is not high enough to break down the diode Z10 and trigger the transistor Q20 into conduction. Hence, with transistor Q20 off, transistor Q21 is also off so as to provide a high effective impedance across the terminal strips 32 and 36. Thus, when the camera actuator button S1 is depressed by the user, and the capacitor has yet to receive its minimum charge, then the output of the amplifier 204 reverts to its "high" level so as to inhibit further camera operations as previously discussed. Once the charge on capacitor C3 reaches its minimum value to sustain an adequate artificial scene light intensity, zener diode Z10 will break down and conduct so as to turn on transistor Q20 which in turn operates to turn on transistor Q21. With transistor Q21 conducting, resistor R3 is connected across the terminal strips 32 and 36. Since the impedance of R3 corresponds to the impedance of an unfired flashlamp, subsequent actuation of the button S1 by the user will again result in the aforementioned examination of the impedance across the terminal strips 32 and 36. However, with the impedance now corresponding to that of an unfired flashlamp, the amplifier 204 will now revert to its "low" level to allow normal operation of the ECM 130. In this manner, operation of the camera 10 may be inhibited until the strobe unit 11 is adequately charged. Thus, either turning on the strobe unit 11 by the on-off switch 94 or awaiting the charging of capacitor C3 constitutes a predetermined event relative to the readying of the strobe in expectation of the commencement of a photographic exposure cycle involving an artificially illuminated subject and the camera 10 is enabled as a function of this predetermined event.

Whereas the camera 10 is herein described as being a Polaroid SX-70 Land Camera, it will be readily understood that the invention is by no means so limited and may be applicable to other cameras such as Polaroid's most recently introduced Pronto Land Camera which also utilizes Polaroid's SX-70 type film.

Since certain changes may be made in the above described system and apparatus without departing from the scope of the invention herein involved, it is intended that all matter contained in the description thereof or shown in the accompanying drawings shall be interpreted as illustrative and not in a limiting sense.

What is claimed is:

1. An electronic flash accessory for a camera of the type having a flash socket adapted for receipt of at least one conventional flash bulb together with means for sensing the terminals of the flash socket which are adapted to connect to the flash bulb to provide a signal which operates to inhibit camera operation when the impedance of the flash bulb is substantially different from the impedance of an unfired non-defunct flash bulb and means for providing a trigger signal, said flash accessory comprising:

a housing;

a storage capacitor;

a discharge tube;

means responsive to an applied voltage for charging said capacitor;

means responsive to the trigger signal for discharging said capacitor through said discharge tube to produce an illuminating flash of light;

connector means for electrically connecting said discharging means to the camera flash socket, said connector means terminating in at least two terminal elements configured to connect respectively to those terminals of the flash socket which are adapted to connect to the flash bulb, said terminal elements thereby accommodating receipt of the trigger signal from the camera; and means normally operative for providing an impedance characteristic across said connector means terminal elements substantially different from the impedance of an unfired non-defunct flash bulb thereby inhibiting camera operation upon connection of said discharging means to the camera socket, said impedance providing means being responsive to a predetermined event relative to the readying of said flash accessory in exception of the commencement of a photographic exposure cycle involving an artificially illuminated subject, for simulating the impedance of an unfired non-defunct flash bulb across said connector means terminal elements thereby enabling the camera to perform a photographic exposure cycle involving an artificially illuminated subject upon actuation by the camera operator.

2. An electronic flash accessory for a camera of the type having a flash socket assembly adapted for receipt of a conventional multiple flash bulb array together with means for sensing the terminals of the flash socket which are adapted to connect to the last flash bulb scheduled to be fired in the array and for providing a signal which operates to inhibit camera operation when the impedance of the last flash bulb scheduled to be fired is substantially different from the impedance of an unfired non-defunct flash bulb and means for providing a trigger signal, said flash accessory comprising:
  a housing;
  a storage capacitor;
  a discharge tube;
  means responsive to an applied voltage for charging said capacitor;
  means responsive to the trigger signal for discharging said capacitor through said discharge tube to produce an illuminating flash of light;
  connector means for electrically connecting said discharge means to the camera flash socket, said connector means terminating in at least two terminal elements configured to connect respectively to those terminals of the flash socket which are adapted to connect to the last flash bulb in the array scheduled to be fired, said terminal elements thereby receiving the trigger signal from the camera; and
  means normally operative for providing an impedance characteristic across said connector means terminal elements substantially different from the impedance of an unfired non-defunct flash bulb thereby inhibiting camera operation upon connection of said discharging means to the camera socket, said impedance providing means being responsive to a predetermined event relative to the readying of said flash accessory in expectation of the commencement of a photographic exposure cycle involving an artificially illuminated subject, for simulating the impedance of an unfired non-defunct flash bulb across said connector means terminal elements thereby enabling said camera to perform a photographic exposure cycle involving an artificially illuminated subject upon actuation by the camera operator.

3. The electronic flash accessory of claim 1 whrein said impedance characteristic providing means includes means for simulating the impedance of an unfired non-defunct flash bulb in series connection with normally open switch means which are arranged to close in response to said predetermined event relative to the readying of said flash accessory.

4. The electronic flash accessory of claim 3 wherein said switch means is arranged to close synchronously with the application of the applied voltage to said capacitor charging means.

5. The electronic flash accessory of claim 3 wherein said switch means is arranged to close synchronously with the charge on said capacitor reading a predetermined value.

* * * * *